United States Patent [19]

Guenthner et al.

[11] 4,298,952

[45] Nov. 3, 1981

[54] ONE'S COMPLEMENT ADDER

[75] Inventors: Russell W. Guenthner, Glendale; Joseph C. Circello; Anthony J. Galcik, both of Phoenix, all of Ariz.

[73] Assignee: Honeywell Information Systems Inc., Phoenix, Ariz.

[21] Appl. No.: 102,300

[22] Filed: Dec. 10, 1979

[51] Int. Cl.³ .............................................. G06F 7/50
[52] U.S. Cl. ................................................... 364/786
[58] Field of Search ........................................ 364/786

[56] References Cited

U.S. PATENT DOCUMENTS

| 3,863,061 | 1/1975 | Kazantzis et al. | 364/786 |
| 3,970,833 | 7/1976 | Gehweiler et al. | 364/786 |
| 4,084,252 | 4/1978 | Miller | 364/738 |

OTHER PUBLICATIONS

S. Morguesan, "Complement Adders Give Unambiguous Zero Output", *Electronic Engineering,* vol. 48, No. 586, p. 25, Dec. 1976.

*Primary Examiner*—David H. Malzahn
*Attorney, Agent, or Firm*—E. W. Hughes; W. W. Holloway, Jr.; N. Prasinos

[57] ABSTRACT

A one's complement adder for adding two binary numbers $A_i$, $B_i$ in the one's complement system is constructed from a conventional adder circuit by connecting the generate output signal G produced by the adder to the carry-in terminal of the adder. The value of the generate signal is independent of the signal applied to the carry-in terminal which prevents the adder from exhibiting sequential or indeterminate behavior.

5 Claims, 3 Drawing Figures

ONE'S COMPLEMENT ADDER

BACKGROUND OF THE INVENTION

1. Field of the Invention

This invention is in the field of digital logic circuitry, and more particularly relates to an improved one's complement adder.

2. Description of the Prior Art

Conventional binary adders for adding two binary numbers, $A_i$, $B_i$ each of i bits, where i is an integer other than 0, are well known in the art. An example of such circuit that can be used to add two binary numbers is that illustrated and described in U.S. Pat. No. 4,084,252 which issued on Apr. 11, 1978 and is assigned to Honeywell Information Systems Inc., the assignee of this Application. Such an adder can be made into a one's complement adder by connecting the most significant carry-out signal, that present at the carry-out terminal, to the least significant carry-in line, the carry-in terminal of the adder.

Modulo $2^i-1$ addition, or the one's complement system, is a commonly required function in error detection circuitry for arithmetic operations of some digital data processing systems. Expressed mathematically, $A_i$ is an i bit one's complement number which is an input to the adder; and $B_i$ is an i bit one's complement number which is a second input to the adder. $F_i$ is the i bit output of the adder; and $$F_i = A_i + B_i$$

Until recently it was thought that a multi-bit one's complement adder would when the sum of $F_i$=zero of $A_i$ and $B_i$ was produced, that the adder would produce $F_i$ as a positive zero, 0,0—00 instead of a negative zero 1,1,—1, as stated in a paper: Shedletsky, John J. *Comments on the Sequential and Indeterminant Behavior of an End-Around-Carry Adder* IEEE Transactions on Computers, March, 1979, p. 270-271 that the sum of a number and its one's complement, or when $F_i$=zero, that zero may be positive or negative depending on the preceeding state of the adder and the relative propagation delays in the adder. Shedletsky, in his paper, shows that the choice between the two possible zero states, all zeroes or all ones, can depend on the preceeding values of the carry lines, sequential behavior; or on the relative propagation delays in the adder, indeterminate behavior, which is also known as a race condition.

Shedletsky proposes a solution to the problem; namely by providing additional circuitry to drive all the carry lines to the one state when the sum of $A_i$ and $B_i$ is zero in the one's complement system.

SUMMARY OF THE INVENTION

The present invention provides an improved one's complement adder for two binary numbers $A_i$, $B_i$ which when the sum $F_i$ of $A_i$ and $B_i$ is zero; the value of $F_i$ is not affected by prior values of the carry lines, or by the relative propagation delays in the adder. This is accomplished by connecting the generate signal G which is independent of the value of the carry-in signal applied to the carry-in terminal of the adder since its value is determined only by $A_i$ $B_i$.

It is therefore an object of this invention to provide an improved one's complement adder which does not exhibit sequential behavior when the sum of the two numbers $A_i$, $B_i$ equals zero.

It is another object of this invention to provide an improved one's complement adder which does not display indeterminate behavior when the sum of two numbers $A_i$ and $B_i$ equals zero.

It is yet another object of this invention to provide an improved one's complement adder in which the signal applied to the carry-in terminal is a function of only the addends $A_i$, $B_i$ applied to the adder.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which.

DETAILED DESCRIPTION OF THE INVENTION

Figure 1:
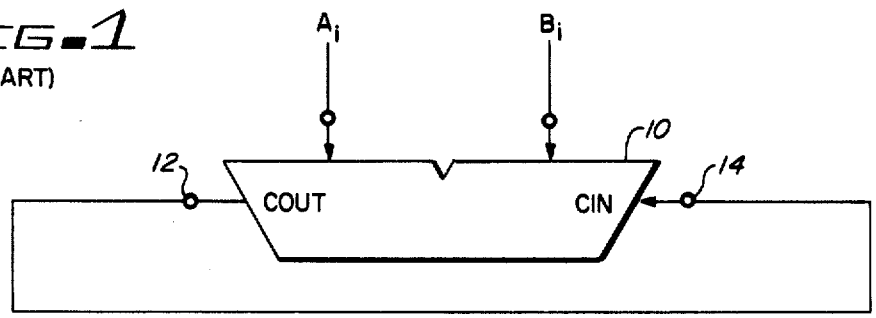
FIG. 1 is a block diagram of a prior art i bit one's complement adder.

In FIG. 1, an i bit adder 10 is illustrated which is adapted to add $A_i$ and $B_i$ where i is an integer other than zero to produce a resultant binary number $F_i$. The carry-out terminal 12 is connected to the carry-in terminal 14, which makes adder 10 a one's complement adder.

Figure 2:
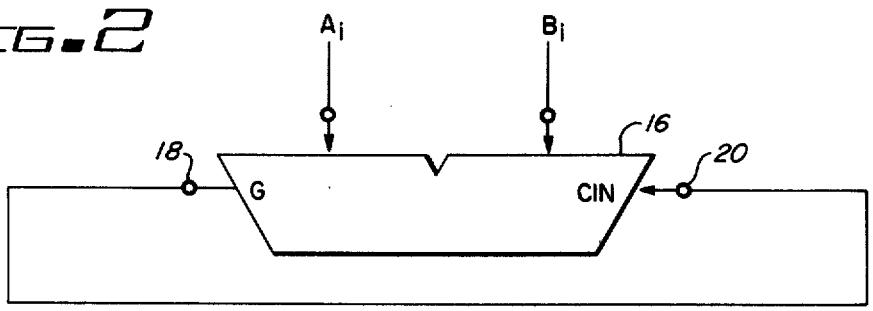
FIG. 2 is a block diagram of the i bit one's complement adder of this invention.

In FIG. 2 a conventional i bit adder 16 is modified to apply the generate signal G produced by adder 16 at terminal 18 to the carry-in terminal 20. This connection makes adder 16 a one's complement, or end around, carry, adder for the addends $A_i$, $B_i$ applied to it, but one which is not subject to sequential behavior or indeterminate behavior in the event that the sum $F_i$ of $A_i$ and $B_i$ equals zero.

Figure 3:
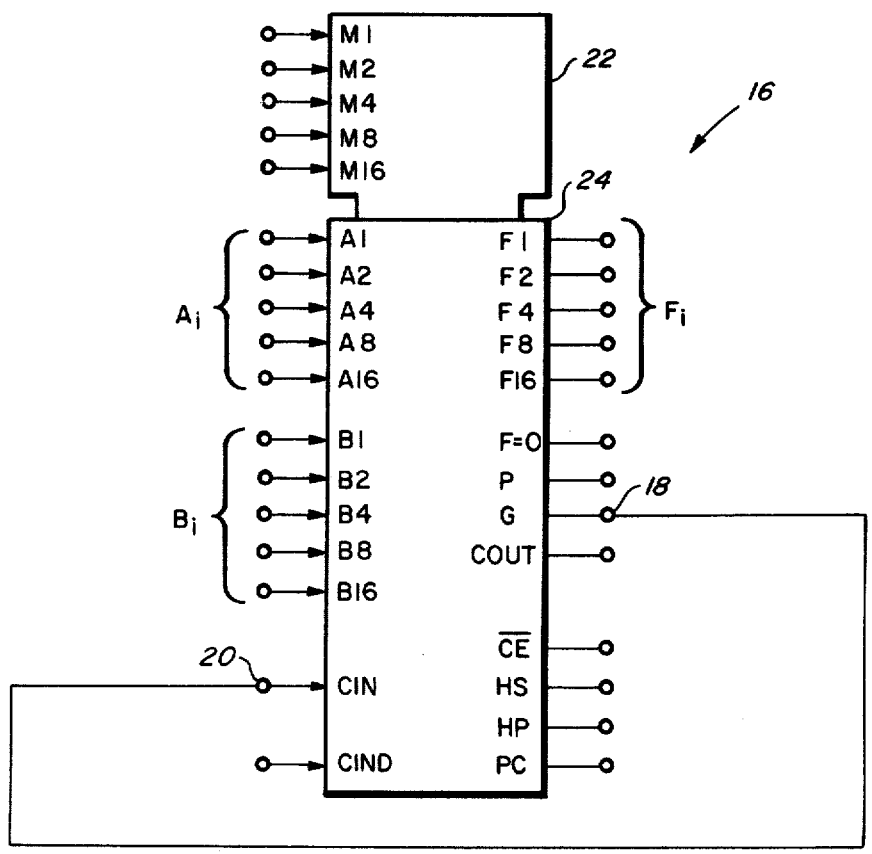
FIG. 3 is a symbolic representation of a current mode 5-bit arithmetic logic unit showing the inputs and the outputs thereof.

In FIG. 3, which is substantially identical to FIG. 1 of U.S. Pat. No. 4,084,252 referred to above more details of adder 16 are provided. Applicants incorporate the disclosure of U.S. Pat. No. 4,084,252 into this application as authorized by MPEP 608.01p.

Adder 16 in a preferred embodiment is a current mode 5-bit arithmetic and logic unit which has a control portion 22 and an input/output portion 24. Control portion 22 is adapted to receive a 5-bit mode control signal M1–M16 which determines the particular arithmetic or logic operation to be performed by device 16. The input/output portion 24 receives two 5-bit input fields $A_i$, A1–A16 and $B_i$, B1–B16. In addition, portion 24 receives a carry-in signal CIN at carry-in terminal 20 and a carry-in duplicate signal CIND at the terminal so marked. The input/output portion 24 generates a 5-bit binary output resultant signal $F_i$, F1–F16 in accordance with the particular arithmetic or logic operation prescribed by the multiple control signals M1–16. In addition, portion 24 produces a zero valued output signal F=0, a propogate signal P, a generate signal G at terminal 18, and a carry-out signal COUT. In addition I/O portion 24 produces a carry error CE signal, a parity of the half-sum signals HS, a parity of the half-sum parity signals HP, and a parity of the carries signals PC.

When logic unit 16 is used as a one's complement adder, the mode control signals M1-M16, the addends $A_i$ and $B_i$ and CIN are the only input signals required. The output signals of interest are the function signal $F_i$, F1-F16 and the carry generate signal G when arithmetic and logic unit (ALU) 16 is operated as a one's complement adder.

To cause circuit 16 to function as a one's complement adder the right combination of mode control signals M1-M16 must be applied to the corresponding mode control input terminals.

In the preferred embodiment of unit 16 the mode control signals are as follows:

M1 = 1, M2 = 0, M4 = 0, M8 = 1, and M16 = 1 which causes $F_i$ to equal $A_i$ plus $B_i$ plus CIN.

The carry generate signal G is defined as follows:

$$G = G16 + HS16.G8 + HS16.HS8.G4 + HS16.HS8.HS4.G2 + HS16.HS8.HS4.HS2.G1$$

The generate signals G16, G8, G4, G2 and G1 are true or are logical one's if the corresponding bits of $A_i$ and $B_i$ are logic one's; i.e., G16 = 1, if A16 and B16 are one's.

The half sum signals HS16, HS8, HS4, HS2 and HS1 are true, or are logical ones, if the corresponding bits of $A_i$ and $B_i$ when added, equals 1; for example HS16 = 1, if A16 = 0 and B16 = 1; or if A16 = 1 and B16 = 0.

The carry-out signal COUT is defined as follows:

$$COUT = G16 + HS16.G8 + HS16.HS8.G4 + HS16.HS8.HS4.G2 + HS16.HS8.HS4.HS2.G1 + HS16.HS8.HS4.HS2.HS1.CIN$$

and differs from G only in the last product term.

From the foregoing it can be seen that the generate signal G at terminal 18 is independent of the signal CIN applied to carry-in terminal 20 and is determined by the values of addends $A_i$, $B_i$ applied to the one's complement adder and not to the value of the carry-in signal CIN.

By applying the generate signal G to the carry-in terminal 20, applicants have eliminated the sequential behavior problem and the indeterminate behavior problem of one's complement adders under certain conditions when the sum of the two addends $A_i$, $B_i$ equals zero in a way that does not force the signal applied to the carry-in terminal to a predetermined value through the use of additional gates and logic circuitry.

What is claimed is:

1. An adder for adding binary signals representing two binary numbers $A_i$, $B_i$ in the one's complement notation each of the numbers having i bits, where i is an integer other than zero, comprising:

two sets of input terminals adapted to have applied to them binary signals representing $A_i$, $B_i$;

a carry-in terminal adapted to have a binary signal representing a binary number to be summed with the two lowest order bits of $A_i$, $B_i$;

i output resultant terminals, said adder including means for producing binary resultant signals $F_i$ representing the sum of $A_i$, $B_i$, and the signal applied to the carry-in terminal at the i output resultant terminals;

a generate output signal terminal, said adder including means for producing a binary signal representing a binary carry generate number G, the value of which is independent of any signal applied to the carry-in terminal, and for applying the carry generate signal G to the generate output terminal; and circuit means for applying the carry generate signal G to the carry-in terminal of the adder.

2. The adder of claim 1 in which i equals 5.

3. An adder for adding binary signals representing two binary numbers $A_i$, $B_i$ in the one's complement notation, each of the numbers having i bits where i is an integer other than zero, comprising:

two sets of input terminals adapted to have applied to them the signals representing $A_i$ and $B_i$;

a carry-in terminal adapted to have a binary signal representing a binary number to be summed with the lowest order bits of $A_i$ and $B_i$;

i output resultant terminals;

said adder including means for producing binary resultant signals $F_i$ representing the sum of $A_i$, $B_i$ and the signal applied to the carry-in terminal at the i output resultant terminals;

a carry generate output signal terminal, said adder including means for producing a binary carry generate signal G which is a function of only $A_i$ and $B_i$, and for applying the carry generate signal G to the generate output signal terminal; and circuit means for applying the carry generate signal G to the carry-in terminal of the adder.

4. The adder of claim 3 in which i equals 5.

5. An adder for adding binary signals representing two binary numbers $A_i$ an $B_i$ in the one's complement notation where i = 5, whereby $A_i$ has five bits A16, A8, A4, A2 and A1 and $B_i$ has five bits B16, B8, B2 and B1; said adder having means for producing carry generate signals G16, G8, G4, G2 and G1 and half sum signals HS16, HS8, HS4, HS2 comprising:

two sets of input terminals of five terminals each adapted to have applied to them the signals representing $A_i$ and $B_i$ respectively;

a carry-in terminal adapted to have a binary signal representing a binary digit to be summed with bits A1 and B1;

five output resultant terminals, said adder including means for producing binary resultant signals $F_i$ representing the binary sum of $A_i$ plus $B_i$ plus the digit applied to the carry-in terminal, and for applying the resultant signals $F_i$ to the output resultant terminals;

a carry generate output signal terminal, said adder including means for producing a carry generate binary signal G which is determined by the Boolean algabraic equation:

G = G16 + HS16.G8 + HS16.HS8.G4 + HS16.HS8.HS4.G2 + HS16.HS8.HS4.HS2.G1 and for applying G to said generate output signal; and circuit means for applying G to the carry-in terminal of the adder.

* * * * *